United States Patent
Omran et al.

(10) Patent No.: US 10,336,311 B2
(45) Date of Patent: Jul. 2, 2019

(54) SYSTEM AND METHOD FOR CONTROLLING THE SPEED OF A WORK VEHICLE DURING DOWNHILL OPERATION

(71) Applicant: CNH Industrial America, LLC, New Holland, PA (US)

(72) Inventors: Ashraf Omran, Clarendon Hills, IL (US); Garth Bulgrien, Ephrata, PA (US); Brian Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/620,970

(22) Filed: Jun. 13, 2017

(65) Prior Publication Data
US 2018/0354488 A1    Dec. 13, 2018

(51) Int. Cl.
*B60W 10/10*      (2012.01)
*B60W 40/105*   (2012.01)
(Continued)

(52) U.S. Cl.
CPC ............ *B60W 10/10* (2013.01); *B60W 10/11* (2013.01); *B60W 30/146* (2013.01); *B60W 30/18072* (2013.01); *B60W 40/105* (2013.01); *B60W 2030/18081* (2013.01); *B60W 2300/152* (2013.01); *B60W 2300/185* (2013.01); *B60W 2510/0638* (2013.01); *B60W 2510/0652* (2013.01); *B60W 2510/0657* (2013.01); *B60W 2550/142* (2013.01); *B60W 2710/1005* (2013.01); *F16H 2061/0237* (2013.01); *F16H 2061/166* (2013.01)

(58) Field of Classification Search
None
See application file for complete search history.

(56) References Cited

U.S. PATENT DOCUMENTS

| 3,599,504 A | 8/1971 | Taylor |
| 4,594,666 A | 6/1986 | Cornell |

(Continued)

OTHER PUBLICATIONS

Extended European Search Report dated Oct. 15, 2018 for related European Application No. 18177158 (7 pages).

*Primary Examiner* — Dirk Wright
(74) *Attorney, Agent, or Firm* — Rickard K. DeMille; Rebecca L. Henkel (57) ABSTRACT

A method for controlling the speed of a work vehicle during downhill operation may include controlling an operation of at least one of an engine or a transmission of a work vehicle so as to maintain the work vehicle operating at a requested speed and identifying an operating condition of the work vehicle that provides an indication that the work vehicle is traveling downhill. In addition, the method may include determining whether at least one pre-condition for downshifting the transmission from a current gear ratio to a downshift gear ratio is satisfied when the operating condition indicates that the work vehicle is currently traveling downhill. Moreover, when it is determined that the pre-condition(s) is satisfied, the method may include controlling the operation of the transmission such that the transmission is downshifted from the current gear ratio to the downshift gear ratio.

16 Claims, 4 Drawing Sheets

(51) Int. Cl.
  *B60W 10/11* (2012.01)
  *B60W 30/14* (2006.01)
  *B60W 30/18* (2012.01)
  *F16H 61/02* (2006.01)
  *F16H 61/16* (2006.01)

(56) References Cited

U.S. PATENT DOCUMENTS

| | | | |
|---|---|---|---|
| 5,113,721 A | 5/1992 | Polly | |
| 5,287,773 A | 2/1994 | Nakawaki et al. | |
| 5,470,288 A | 11/1995 | Palansky et al. | |
| 5,531,654 A * | 7/1996 | Ishikawa | F16H 61/0213 477/120 |
| 5,555,170 A * | 9/1996 | Nakashima | F16H 59/66 477/120 |
| 5,749,804 A * | 5/1998 | Toukura | F16H 61/66254 477/47 |
| 5,765,117 A * | 6/1998 | Horiguchi | F16H 61/0213 477/120 |
| 5,816,979 A * | 10/1998 | Shiiba | F16H 61/143 477/176 |
| 5,890,993 A * | 4/1999 | Horiguchi | F16H 61/0213 477/94 |
| 6,067,495 A * | 5/2000 | Fliearman | F16H 61/0213 477/108 |
| 6,106,434 A * | 8/2000 | Ibamoto | F16H 59/66 477/118 |
| 6,349,253 B1 * | 2/2002 | Bellinger | B60W 10/06 477/115 |
| 6,553,302 B2 | 4/2003 | Goodnight et al. | |
| 7,217,899 B2 | 5/2007 | Bates et al. | |
| 7,490,588 B2 * | 2/2009 | Kimura | B60W 30/18136 123/320 |
| 8,165,764 B2 | 4/2012 | Wolfgang et al. | |
| 8,370,032 B2 * | 2/2013 | Choby | F16H 59/66 303/161 |
| 8,401,753 B2 * | 3/2013 | Chappell | B60W 10/06 701/50 |
| 8,554,426 B2 | 10/2013 | Hou | |
| 9,052,013 B2 * | 6/2015 | Landes | F16H 61/21 |
| 9,399,458 B2 | 7/2016 | Kaltenbach | |
| 9,643,610 B2 * | 5/2017 | Bjernetun | B60W 30/18072 |
| 10,065,641 B2 * | 9/2018 | Fraser | B60W 10/10 |
| 2001/0016795 A1 | 8/2001 | Bellinger | |
| 2013/0066493 A1 | 3/2013 | Martin et al. | |
| 2015/0345621 A1 | 12/2015 | Sujan et al. | |
| 2016/0264122 A1 | 9/2016 | Gauthier | |

* cited by examiner

SYSTEM AND METHOD FOR CONTROLLING THE SPEED OF A WORK VEHICLE DURING DOWNHILL OPERATION

FIELD OF THE INVENTION

The present subject matter relates generally to work vehicles and, more particularly, to a system and method for controlling the speed of a work vehicle during downhill operation so as to limit over-speeding while minimizing fuel consumption.

BACKGROUND OF THE INVENTION

When a work vehicle is operating on a downhill slope, the gravity acting on the work vehicle functions to drive the transmission and the engine, particularly when operating on steep slopes or for normal downhill slopes with high vehicle loads. Since conventional engines do not include a mechanism for providing an active-negative torque, there is no active control over the engine speed when gravity begins to drive the engine during downhill operation. As such, in many instances, the only option for regulating the speed of the work vehicle as it travels downhill is to control the operation of the transmission.

Unfortunately, conventional control systems lack the ability to properly regulate the operation of the transmission while accounting for fuel consumption of the engine so as to maintain a desired fuel efficiency for the work vehicle as it travels downhill. Accordingly, an improved system and method for controlling the speed of a work vehicle during downhill operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the speed of a work vehicle during downhill operation. The method may generally include controlling, with a computing device, an operation of at least one of an engine or a transmission of a work vehicle so as to maintain the work vehicle operating at a requested speed and identifying, with the computing device, an operating condition of the work vehicle that provides an indication that the work vehicle is traveling downhill. In addition, the method may include determining, with the computing device, whether at least one pre-condition for downshifting the transmission from a current gear ratio to a downshift gear ratio is satisfied when the operating condition indicates that the work vehicle is currently traveling downhill, wherein the pre-condition(s) includes a first pre-condition requiring that the requested speed be less than or equal to an estimated speed for the work vehicle following the downshift. Moreover, when it is determined that the pre-condition(s) is satisfied, the method may include controlling, with the computing device, the operation of the transmission such that the transmission is downshifted from the current gear ratio to the downshift gear ratio.

In another aspect, the present subject matter is directed to a system for controlling the speed of a work vehicle during downhill operation. The system may include an engine, a transmission coupled to the engine, and a controller communicatively coupled to at least one of the engine or the transmission. The controller may include a processor and related memory. The memory may store instructions that, when implemented by the processor, configure the controller to control an operation of at least one of the engine or the transmission so as to maintain the work vehicle operating at a requested speed and identify an operating condition of the work vehicle that provides an indication that the work vehicle is traveling downhill. The controller may also be configured to determine whether at least one pre-condition for downshifting the transmission from a current gear ratio to a downshift gear ratio is satisfied when the operating condition indicates that the work vehicle is currently traveling downhill, wherein the pre-condition(s) includes a first pre-condition requiring that the requested speed be less than or equal to an estimated speed for the work vehicle following the downshift. Moreover, when it is determined that the pre-condition(s) is satisfied, the controller may be configured to control the operation of the transmission such that the transmission is downshifted from the current gear ratio to the downshift gear ratio.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the speed of a work vehicle during downhill operation. Specifically, in several embodiments, when it is determined that the work vehicle is traveling downhill, a controller of the disclosed system may be configured to automatically downshift the transmission to limit over-speeding of the work vehicle when one or more downshifting pre-conditions are satisfied. For example, in one embodiment, the controller may only be configured to downshift the transmission when a requested axle or wheel speed for the work vehicle is less than or equal to an estimated axle/wheel speed that the work vehicle would achieve following the downshift if the engine speed remained constant. As such, the controller may refrain from downshifting the transmission when the resulting axle/wheel speed would drop below the requested speed, thereby eliminating the need for the engine to burn additional fuel to increase the axle/wheel speed back up to the requested speed. Accordingly, the disclosed system and method may allow for the speed of a work vehicle to be controlled during downhill operation while taking into account fuel consumption considerations.

It should be appreciated that, in several embodiments of the present subject matter, the disclosed system and method may be implemented when the work vehicle is operating in an auto-efficiency or cruise control mode. For example, the operator may have requested that the work vehicle be maintained at a given ground speed. In such instance, the controller may be configured to control the operation of the vehicle's engine and/or transmission so as to maintain the work vehicle at the requested speed. Thus, when the work vehicle begins to travel downhill, aspects of the present subject matter may be utilized to maintain the work vehicle at or near the requested speed while limiting unnecessary fuel consumption.

Figure 1:
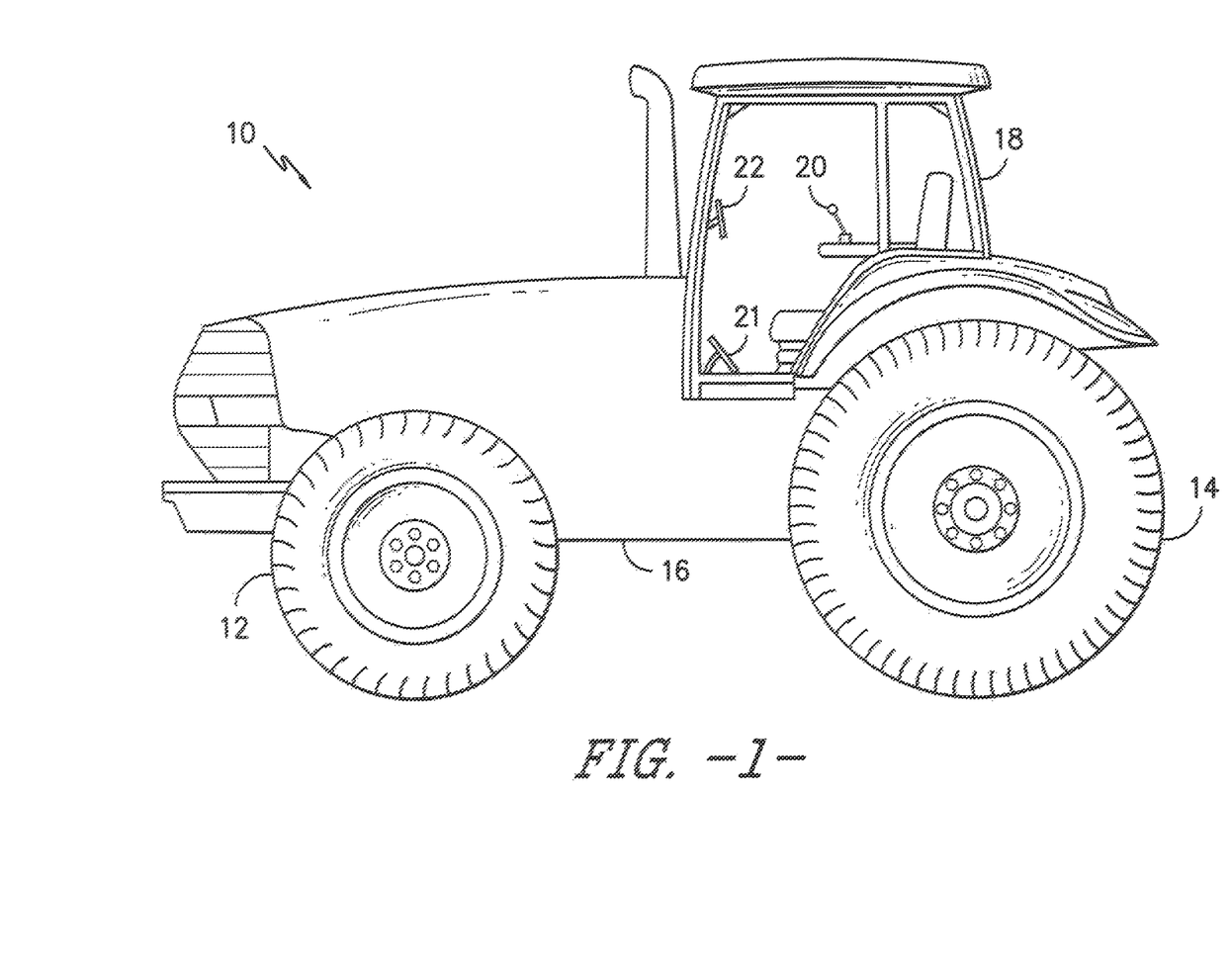
FIG. 1 illustrates a side view of one embodiment of a work vehicle in accordance with aspects of the present subject matter.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include an input lever 20 for controlling the engine speed of the vehicle 10 and a clutch pedal 21. In addition, the work vehicle 10 may include a control panel 22 for displaying message windows and/or alerts to the operator and/or for allowing the operator to interface with the vehicle's controller. For instance, in one embodiment, the control panel 22 may include buttons, knobs and/or any other suitable input devices that allow the operator to provide user inputs to the controller, such as by allowing the operator to provide an input instructing the controller to operate the work vehicle 10 in an auto-efficiency mode or cruise control mode so as to maintain the vehicle 10 at a desired ground speed.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, the work vehicle may include an articulated chassis to steer the work vehicle 10, or rely on tracks in lieu of the wheels 12, 14. Additionally, the work vehicle 10 may also be configured to be operably coupled to any suitable type of work implement.

Figure 2:
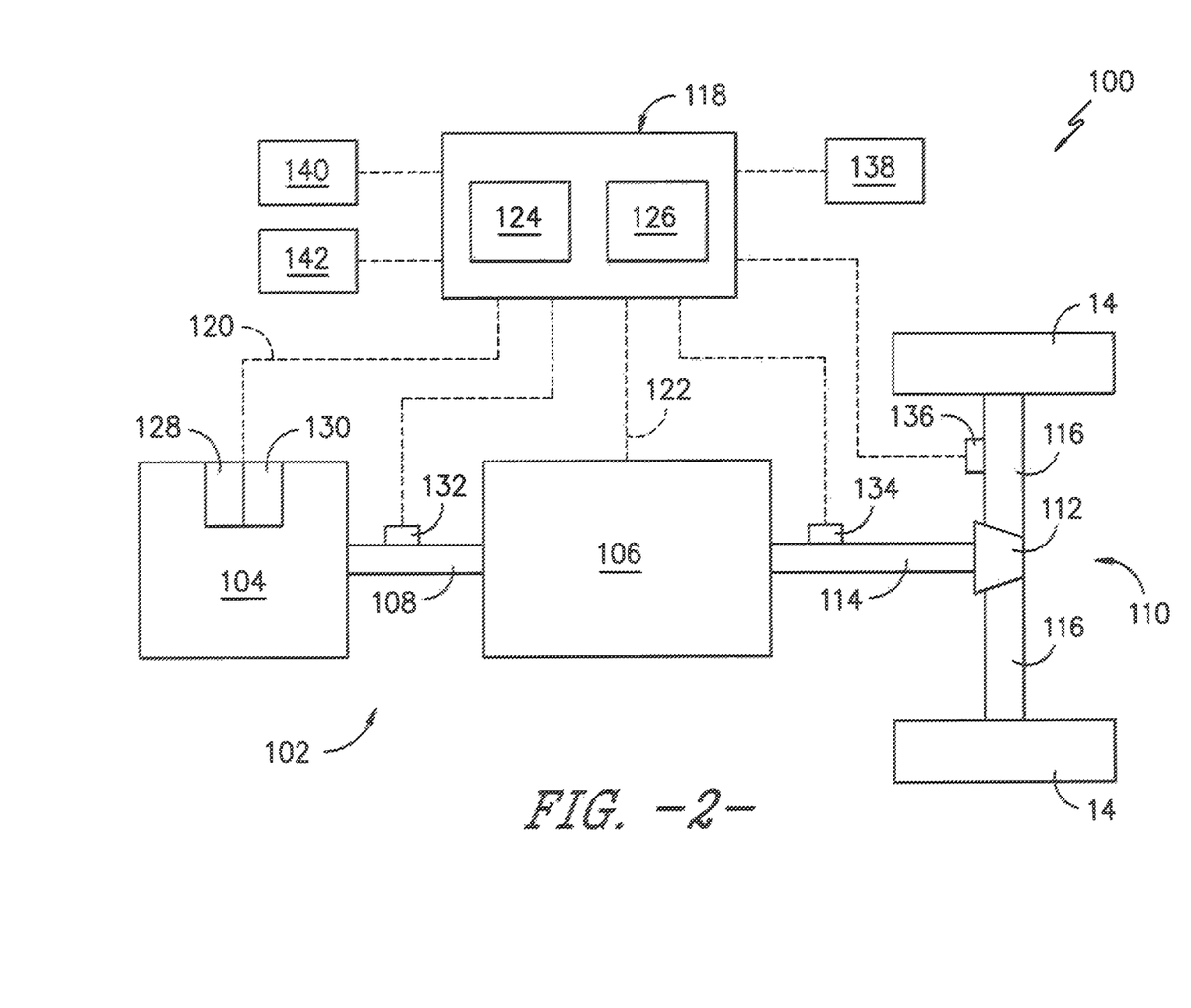
FIG. 2 illustrates a schematic view of one embodiment of a system for controlling the speed of a work vehicle during downhill operation in accordance with aspects of the present subject matter.

Referring now to FIG. 2, a schematic diagram of one embodiment of a system 100 for controlling the speed of a work vehicle during downhill operation is illustrated in accordance with aspects of the present subject matter. For purposes of discussion, the system 100 will be described herein with reference to the work vehicle 10 shown and described above with reference to FIG. 1. However, it should be appreciated that, in general, the disclosed system 100 may be utilized to control the operation of any work vehicle having any suitable vehicle configuration.

As shown, the system 100 may generally include a drivetrain 102 suitable for transferring power to the drive wheels of the work vehicle 10 (e.g., the rear wheels 14). In general, the drivetrain 102 may include an engine 104 and a transmission 106 configured to be mounted on the chassis 16 (FIG. 1) of the work vehicle 10. The transmission 106 may be operably coupled to the engine 104 via one or more shafts 108 and may be configured to provide variably adjusted gear ratios for transferring engine power to the drive wheels 14 via a drive axle assembly 110. As shown, the drive axle assembly 110 may include a differential 112 coupled to an output shaft 114 of the transmission 106 and one or more axle shafts 116 coupled to the differential 112 for transferring power to the drive wheels 14.

As shown in FIG. 2, the system 100 may also include a controller 118 configured to control the operation of one or more components of the work vehicle 10, such as the engine 104 and the transmission 106. For example, the controller 118 may be communicatively coupled to one or more components of the engine 104 (e.g., an engine governor or engine control unit (ECU) (not shown)) via one or more communicative links 120 in order to control and/or monitor the speed and/or torque output of the engine 104. Similarly, the controller 118 may be communicatively coupled to one or more transmission components via one or more communicative links 122 to control the operation of the transmission 106. For instance, the controller 118 may be configured to transmit suitable current commands via communicative link 122 to one or more clutch valves (not shown) to control the engagement and disengagement of one or more clutches (not shown) of the transmission 106. As such, the controller 118 may be configured to cause the transmission 106 to be upshifted or downshifted, as desired, to adjust the current gear ratio of the transmission 106.

It should be appreciated that the controller 118 may generally comprise any suitable processor-based device known in the art, such as one or more computing devices. Thus, in several embodiments, the controller 118 may include one or more processor(s) 124 and associated memory 126 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 126 of the controller 118 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 126 may generally be configured to store suitable computer-readable instructions that, when implemented by the processor(s) 124, configure the controller 118 to perform various computer-implemented functions, such as the control algorithm 200 described below with reference to FIG. 3 and/or the method 300 described below with reference to FIG. 4. In addition, the controller 118 may also include various other suitable components, such as a communications circuit or module, one or more input/output channels, a data/control bus and/or the like.

It should also be appreciated that the controller 118 may correspond to an existing controller of the work vehicle 10 (e.g., an existing engine and/or transmission controller) or the controller 118 may correspond to a separate controller. For instance, in one embodiment, the controller 118 may form all or part of a separate plug-in module that may be installed within the work vehicle 10 to allow for the disclosed system and method to be implemented without requiring additional software to be uploaded onto existing control devices of the vehicle 10.

The system 100 may also include one or more sensors for monitoring various operating parameters of the work vehicle 10. For example, as shown in FIG. 2, the controller 118 may be communicatively coupled to various sensors, such as a torque sensor 128 and/or a speed sensor 130, mounted on and/or within the engine 104 for monitoring the engine torque loads and/or the engine speed. In one embodiment, the sensor(s) 128, 130 may comprise an internal sensor(s) of an engine governor (not shown) of the engine 104. In another embodiment, the system 100 may include any other suitable sensor(s) configured to monitor the torque loads and/or the speed of the engine 104. For instance, a suitable sensor 132 may be provided in association with the output shaft 108 of the engine 104 for monitoring the current engine speed (e.g., in RPMs).

Moreover, the system 100 may also include one or more sensors (e.g., shaft encoders, shaft sensors and/or any other suitable sensors) configured to monitor one or more additional rotational speeds of the drivetrain 102 and/or the ground speed of the work vehicle 10. For example, as shown in FIG. 2, the system 100 may include a first speed sensor 134 provided in operative association with the transmission 106 and/or the output shaft 114 for monitoring the transmission output speed. In addition, the system 100 may optionally include a second speed sensor 136 provided in operative association with the drive axle assembly 110 for monitoring the axle speed of the drive axles 116 (and, thus, the rotational speed of the drive wheels 14). Further, the system 100 may also include a ground speed sensor 138 for monitoring the current ground speed of the work vehicle 10. In one embodiment, the ground speed sensor 138 may correspond to a OPS device or any other suitable sensing device configured to provide an indication of the ground speed of the work vehicle 10.

As shown in FIG. 2, the system 100 may also include one or more input devices 140, 142 communicatively coupled to the controller 118 to allow operator inputs to be provided to the system 100. For example, as indicated above, the work vehicle 10 may include an input device 140 (e.g., input lever 20 shown in FIG. 1) configured to permit an operator to input an engine speed command corresponding to a desired engine speed for the vehicle 10. Upon receipt of the engine speed command, the controller 118 may be configured to control the operation of the engine 104 in order to achieve the requested engine speed. Similarly, as indicated above, the work vehicle 10 may include a suitable input device 142 (e.g., a button, switch or other suitable input device positioned on the control panel 22 shown in FIG. 1) configured to permit an operator to input a ground speed command corresponding to a desired ground speed for the vehicle 10, such as when the work vehicle 10 is being operated in an auto-efficiency mode or cruise control mode. In such an embodiment, upon receipt of the ground speed command, the controller 118 may be configured to control the operation of the engine 104 and/or the transmission 106 in order to achieve the requested ground speed.

Moreover, in accordance with aspects of the present subject matter, the controller 118 may, in several embodiments, be configured to implement a suitable control algorithm and/or method for controlling the speed of a work vehicle during downhill operation. For example, as will be described below with reference to FIGS. 3 and 4, the controller 118 may be configured to automatically downshift the transmission 106 as the work vehicle 10 is traveling downhill to limit over-speeding of the work vehicle 10 when it is determined that one or more downshifting pre-conditions for the vehicle 10 are satisfied. For example, the downshifting pre-conditions may be applied by the controller 118 such that the transmission 106 is downshifted only when doing so would avoid unnecessary fuel consumption by the engine 102 and/or limit the engine speed from exceeding a maximum threshold speed set for the engine 102.

Figure 3:
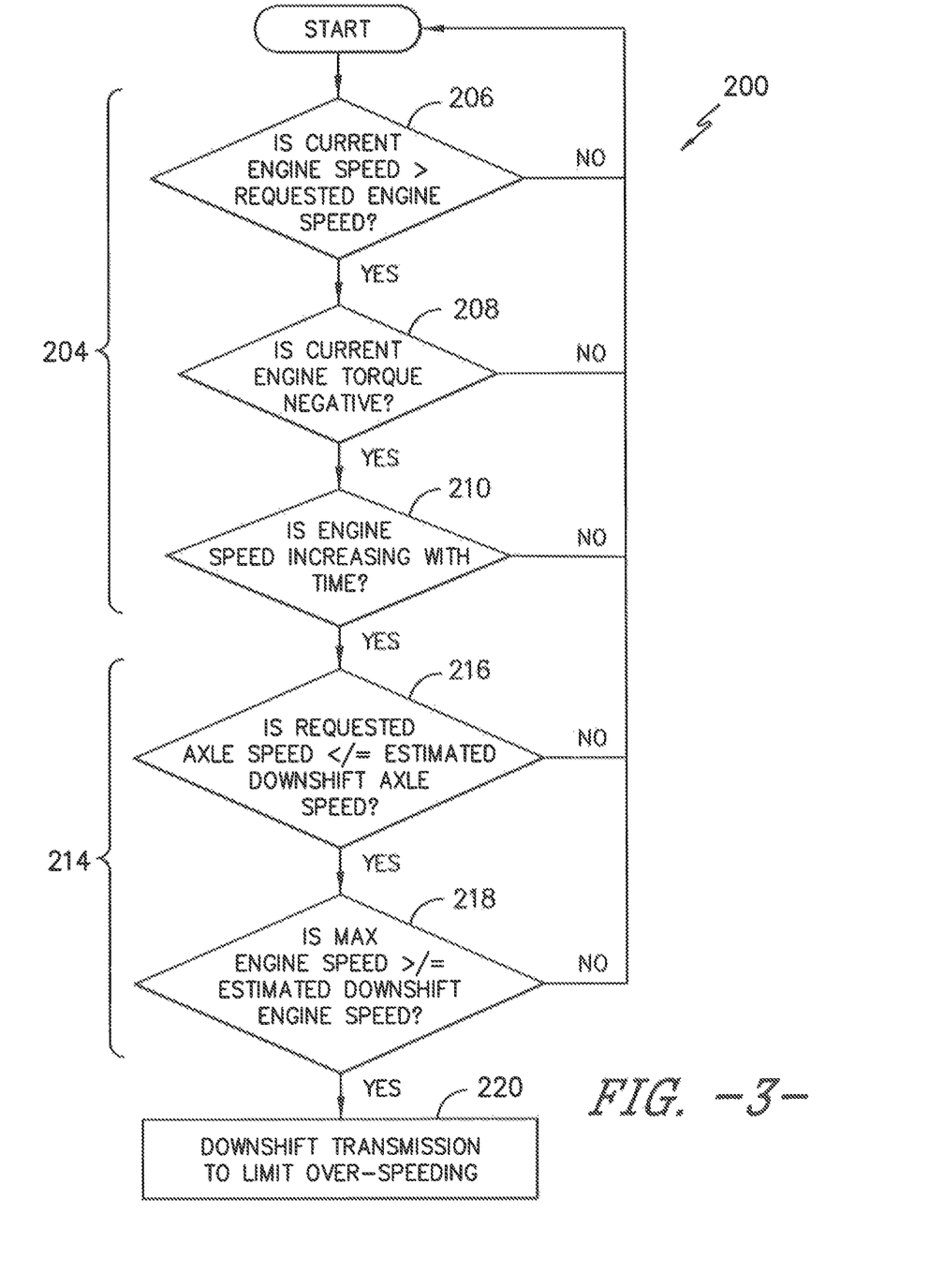
FIG. 3 illustrates a flow diagram of one embodiment of a control algorithm configured to be implemented by a controller of a work vehicle for controlling the speed of a work vehicle during downhill operation in accordance with aspects of the present subject matter.

Referring now to FIG. 3, a flow diagram of one embodiment of a control algorithm 200 that may be used for controlling the speed of a work vehicle during downhill operation is illustrated in accordance with aspects of the present subject matter. In general, the control algorithm 200 will be described herein as being implemented by the controller 118 of the system 100 described above with reference to FIG. 2. However, it should be appreciated that the various processes described below may alternatively be implemented by a separate computing device or by a combination of computing devices. In addition, although FIG. 3 depicts control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

In several embodiments, the control algorithm 200 may include identifying one or more operating conditions of the work vehicle 10 that are indicative of downhill operation. In general, the controller 118 may be configured to monitor any suitable operating parameter(s) of the work vehicle 10 that provides an indication that the work vehicle 10 is currently traveling downhill. For instance, in one embodiment, the controller 118 may be configured to monitor both the engine speed and the engine torque during vehicle operation and analyze such monitored values to identify one or more operating conditions that are indicative of the work vehicle 10 traveling downhill. Specifically, as will be described below, the controller 118 may be configured to use the monitored speed/torque values for the engine 104 to identify whether one or more predetermined downhill-indicating conditions are currently satisfied for the work vehicle 10.

For example, as shown in FIG. 3, the control algorithm 200 may, in one embodiment, utilize three separate downhill-indicating conditions (indicated by bracket 204) to estimate when the work vehicle 10 is currently traveling downhill. Specifically, at (206), the controller 118 may be configured to determine whether the current engine speed is greater than the requested engine speed for the engine 104. If not, the control algorithm 200 is looped back to its initiating step. However, if the current engine speed is greater than the requested engine speed, the controller 118 may, at (208), determine whether the current engine torque is negative. If not, the control algorithm 200 is looped back to its initiating step. Alternatively, if the current engine torque is negative, the controller 118 may, at (210), determine whether the engine speed is increasing with time. For example, the controller 118 may analyze the monitored engine speed values over a given time period to determine whether the engine speed is increasing across such time period. If the engine speed is not increasing with time, the control algorithm 200 is looped back to its initiating step. However, if the controller 118 determines that the engine speed is increasing over time (and, thus, all three downhill-indicating conditions 204 are satisfied), the controller 118 may identify that the work vehicle 10 is currently traveling downhill. As such, the control algorithm 200 may proceed to steps 216, 218 to determine whether a downshift should be performed within the transmission 106 to limit over-speeding of the work vehicle 10 at it is traveling downhill.

It should be appreciated that, in other embodiments, the control algorithm 200 may utilize any other suitable downhill-indicating conditions for estimating or determining when the work vehicle 10 is traveling downhill, including any sub-combination of the downhill-indicating conditions 204 shown in FIG. 3 and/or any other suitable downhill-indicating conditions. For instance, in an alternative embodiment, the controller 118 may be communicatively coupled to an orientation or inclination sensor(s) (not shown), such as one or more accelerometers, inclinometers, gyroscopes and/or any other suitable sensor(s) configured to monitor the angle of inclination of the work vehicle 10 by measuring its orientation relative to gravity. In such an embodiment, the controller 118 may be configured to determine when the work vehicle 10 is downwardly inclined based on the sensor measurements in order to identify that the vehicle 10 is traveling downhill.

As shown in FIG. 3, upon determining that the work vehicle 10 is traveling downhill, the controller 118 may determine if one or more pre-conditions (e.g., as indicated by brackets 214) for downshifting the transmission 106 are satisfied. Specifically, in several embodiments, the controller 118 may only be configured to downshift the transmission 104 during downhill operation when the downshift can be implemented without causing an unnecessary increase in the vehicle's fuel consumption and/or without resulting in the engine speed increasing beyond a given threshold. By requiring such pre-conditions for downshifting the transmission 106, the work vehicle 10 may be operated when traveling downhill in a manner that maintains the desired fuel efficiency while prevents or minimizes potential damage to the engine 106.

As shown in FIG. 3, as a first pre-condition for downshifting the transmission 106, the controller 118 may, at (216), determine whether the requested axle speed for the work vehicle 10 is less than or equal to an estimated axle speed for the work vehicle 10 assuming the downshift is performed and the engine speed remains constant. Such a pre-condition may ensure that the downshift is only performed when the braking action resulting from the downshift would not cause the axle speed to drop below the requested axle speed for the work vehicle 10. Specifically, if the braking action occurring with the downshift would result in a reduction of the axle speed below the requested axle speed for the work vehicle 10, the engine 104 would need to consume additional fuel to increase the axle speed back up to the requested axle speed. Thus, by implementing the first pre-condition for downshifting the transmission 106, the operation of the work vehicle 10 may be controlled without causing an unnecessary increase in the vehicle's fuel consumption.

It should be appreciated that, in one embodiment, the first pre-condition for downshifting the transmission 106 may be expressed according to the following relationship (i.e., Equation 1):

$$\omega_{Req\_Axle} \leq \omega_{downshift\_Axle} = \omega_{eng} * \eta_{downshift} \qquad (1)$$

wherein, $\omega_{Req\_Axle}$ corresponds to the requested axle speed for the work vehicle 10 to maintain the desired ground speed, $\omega_{downshift\_Axle}$ corresponds to the estimated axle speed for the work vehicle 10 following the downshift, $\omega_{eng}$ corresponds to the current engine speed for the engine 106, and $\eta_{downshift}$ corresponds to the gear ratio for the transmission 106 following the downshift.

As shown in FIG. 3, if the requested axle speed will be greater than the estimated axle speed for the work vehicle 10 following the downshift, the control algorithm 200 is looped back to its initiating step without downshifting the transmission 106. However, if the requested axle speed will be less than or equal to the estimated axle speed for the work vehicle following the downshift, the controller 118 may then determine whether the second pre-condition for downshifting the transmission 106 is satisfied. For example, at (218), the controller 118 may determine whether the maximum allowable engine speed for the engine 104 is greater than or equal to an estimated engine speed for the engine 104 assuming the downshift is performed. Specifically, given that downshifting the transmission 106 will drive the engine speed upward, the second pre-condition may be provided to ensure that the downshift will not result in the engine speed increasing beyond the maximum allowable engine speed set for the engine 104, thereby preventing or minimizing the potential damage to the engine 104 that may otherwise occur due to an engine over-speed condition.

It should be appreciated that, in one embodiment, the second pre-condition for downshifting the transmission 106 may be expressed according to the following relationship (i.e., Equation 2):

$$\omega_{max\_eng} \geq \omega_{downshift\_eng} = \omega_{eng} \frac{\eta_{current}}{\eta_{downshift}} \qquad (2)$$

wherein, $\omega_{max\_eng}$ corresponds to the maximum allowable engine speed for the engine 104, $\omega_{downshift\_eng}$ corresponds to the estimated engine speed following the downshift if the axle speed remains constant, $\omega_{eng}$ corresponds to the current engine speed for the engine 104, $\eta_{current}$ corresponds to the current gear ratio for the transmission 106, and $\eta_{downshift}$ corresponds to the gear ratio for the transmission 106 following the downshift.

As shown in FIG. 3, if the maximum allowable engine speed for the engine 104 is not greater than or equal to the estimated engine downshift speed, the control algorithm 200 is looped back to its initiating step without downshifting the transmission 106. However, if the controller 119 determines that the maximum allowable engine speed is greater than or equal to the estimated engine downshift speed (and, thus, both downshifting pre-conditions 214 are satisfied), the controller 118 may, at (220), automatically downshift the transmission 106. Specifically, the controller 118 may be configured to automatically control the operation of the transmission 106 such that the transmission 106 is downshifted to a lower gear, thereby preventing or limiting the work vehicle 10 from over-speeding as it travels downhill.

It should be appreciated that, in other embodiments, the control algorithm 200 may only utilize one of the downshifting pre-conditions 214 shown in FIG. 3 when determining whether to downshift the transmission 106 as the work vehicle 10 travels downhill. Alternatively, any other suitable downshift pre-conditions may be used by the controller 118 for determining whether to downshift the transmission 106.

Figure 4:
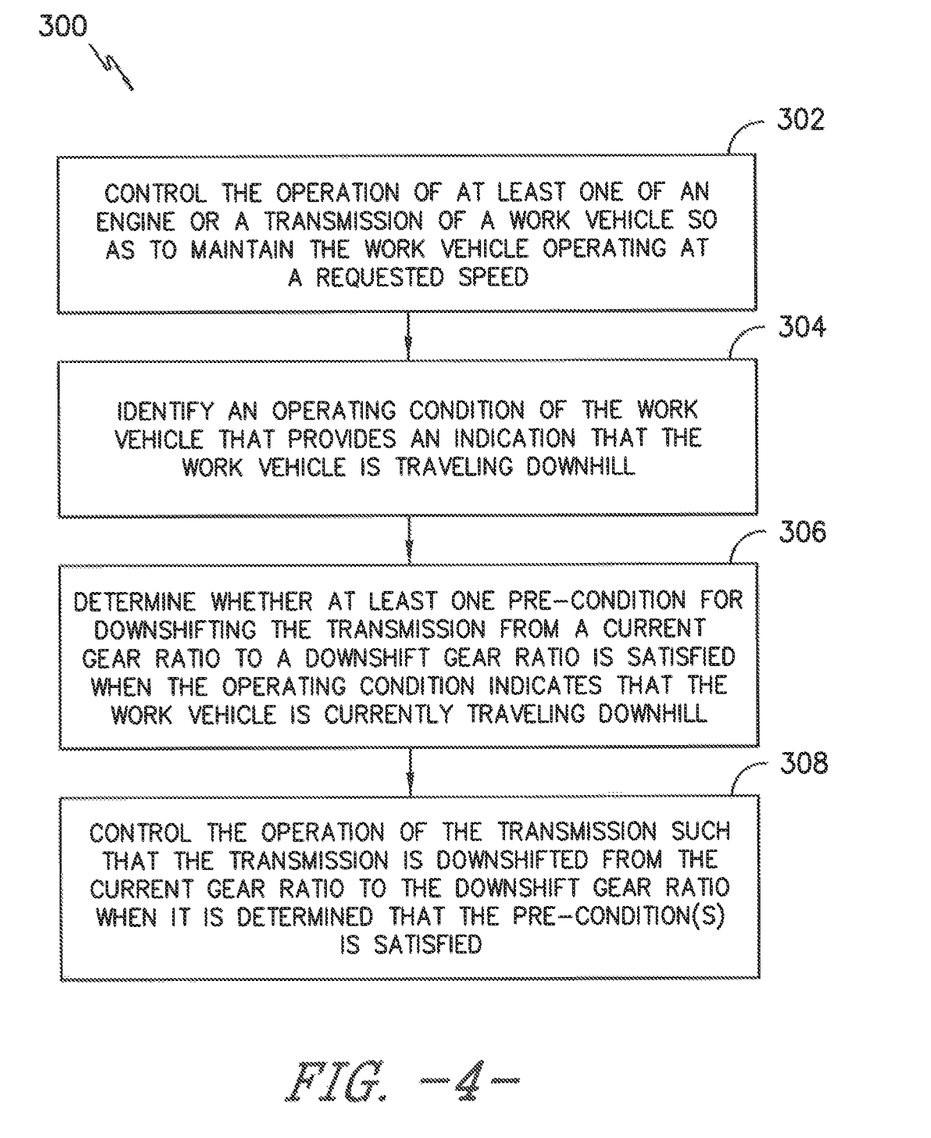
FIG. 4 illustrates a flow diagram of one embodiment of a method for controlling the speed of a work vehicle during downhill operation in accordance with aspects of the present subject matter.

Referring now to FIG. 4, a flow diagram of one embodiment of a method 300 for controlling the speed of a work vehicle during downhill operation is illustrated in accordance with aspects of the present subject matter. In general, the method 300 will be described herein with reference to the system 100 described above with reference to FIG. 2 and the control algorithm 200 described above with reference to FIG. 3. However, it should be appreciated by those of ordinary skill in the art that the disclosed method 300 may be implemented within any other system and/or using any other suitable control algorithm. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 may include controlling an operation of at least one of an engine or a transmission of a work vehicle so as to maintain the work vehicle operating at a requested speed. As indicated above, the system controller 118 may be configured control the operation of the engine 104 and/or transmission 106 so as to maintain one or more requested speeds, such as a requested engine speed, a requested axle speed and/or a requested ground speed. For instance, in one embodiment, the controller 118 may be configured to execute an auto-efficiency mode or cruise control mode in which the operator selects a desired ground speed for the work vehicle 10. The controller may then determine the appropriate engine speed and/or axle speed required to maintain the work vehicle 10 at the operator-selected ground speed.

Additionally, at (304), the method 300 may include identifying an operating condition of the work vehicle that provides an indication that the work vehicle is traveling downhill. Specifically, as indicated above, the controller 118 may be configured to monitor one or more operating parameters and compare the monitored parameters to one or more predetermined operating conditions for the work vehicle 10 that are indicative of the vehicle 10 currently traveling downhill. For instance, in one embodiment, the controller 118 may determine that the work vehicle 10 is traveling downhill by identifying that the current engine speed is greater than the requested engine speed, that the current engine torque is negative, and that the engine speed is increasing with time. However, in other embodiments, any other suitable downhill-indicating conditions may be utilized by the controller 118 to determine or estimate when the work vehicle 10 is travelling downhill.

Moreover, at (306), the method 300 may include determining whether at least one pre-condition for downshifting the transmission from a current gear ratio to a downshift gear ratio is satisfied when the operating condition indicates that the work vehicle is currently traveling downhill. For instance, as indicated above, the controller 118 may be configured to evaluate whether first and second pre-conditions are satisfied prior to downshifting the transmission 106, namely whether the requested axle speed for the work vehicle 10 will be less than or equal to an estimated axle speed for the work vehicle 10 following the downshift and whether the maximum allowable engine speed will be greater than or equal to the estimated engine speed for the work vehicle 10 following the downshift. However, in other embodiments, any other suitable downshifting pre-condition(s) may be applied by the controller 118, such as by only applying one of the above-mentioned pre-conditions.

Referring still to FIG. 4, at (308), the method 300 may include controlling the operation of the transmission such that the transmission is downshifted from the current gear ratio to the downshift gear ratio when it is determined that the at least one pre-condition is satisfied. For example, as indicated above, the controller 118 may be configured to automatically control the operation of the transmission 106. Thus, when it is determined that the downshifting pre-condition(s) is/are satisfied, the controller 118 may be configured to automatically downshift the transmission 106 to a lower gear to limit over-speeding of the work vehicle 10 as it travels downhill. In particular, the downshift may be executed so as to maintain the work vehicle 10 operating at the requested axle or wheel speed for the work vehicle (and, thus, the requested ground speed) while minimizing fuel consumption of the engine 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the speed of a work vehicle during downhill operation, the method comprising:
    controlling, with a computing device, an operation of at least one of an engine or a transmission of a work vehicle so as to maintain the work vehicle operating at a requested speed;
    identifying, with the computing device, an operating condition of the work vehicle that provides an indication that the work vehicle is traveling downhill;
    determining, with the computing device, whether at least one pre-condition for downshifting the transmission from a current gear ratio to a downshift gear ratio is satisfied when the operating condition indicates that the work vehicle is currently traveling downhill, the at least one pre-condition including a first pre-condition requiring that the requested speed be less than or equal to an estimated speed for the work vehicle following the downshift;
    when it is determined that the at least one pre-condition is satisfied, controlling, with the computing device, the operation of the transmission such that the transmission is downshifted from the current gear ratio to the downshift gear ratio.

2. The method of claim 1, wherein the requested speed corresponds to a requested axle speed for the work vehicle.

3. The method of claim 2, wherein determining whether the first pre-condition is satisfied comprises determining whether the following relationship is satisfied:

$$\omega_{Req\_Axle} \leq \omega_{eng} * \eta_{downshift}$$

wherein, $\omega_{Req\_Axle}$ corresponds to the requested axle speed for the work vehicle, $\omega_{eng}$ corresponds to a current engine speed for the engine, and $\eta_{downshift}$ corresponds to the downshift gear ratio.

4. The method of claim 1, wherein the at least one pre-condition further comprises a second pre-condition requiring that a maximum allowable engine speed for the engine be greater than or equal to an estimated engine speed for the engine following the downshift.

5. The method of claim 4, wherein determining whether the second pre-condition is satisfied comprises determining whether the following relationship is satisfied:

$$\omega_{max\_eng} \geq \omega_{eng} \frac{\eta_{current}}{\eta_{downshift}}$$

wherein, $\omega_{max\_eng}$ corresponds to the maximum allowable engine speed for the engine, $\omega_{eng}$ corresponds to a current engine speed for the engine, $\eta_{current}$ corresponds to the current gear ratio, and $\eta_{downshift}$ corresponds to the downshift gear ratio.

6. The method of claim 1, further comprising monitoring a current engine speed of the engine relative to a requested engine speed for the engine.

7. The method of claim 6, wherein identifying the operating condition of the work vehicle comprises identifying that the engine speed is greater than the requested engine speed.

8. The method of claim 7, wherein identifying the operating condition of the work vehicle further comprises identifying that an engine torque for the engine is negative and that the engine speed is increasing over time.

9. A system for controlling the speed of a work vehicle during downhill operation, the system comprising:
    an engine;
    a transmission coupled to the engine;
    a controller communicatively coupled to at least one of the engine or the transmission, the controller including a processor and related memory, the memory storing instructions that, when implemented by the processor, configure the controller to:
        control an operation of at least one of the engine or the transmission so as to maintain the work vehicle operating at a requested speed;
        identify an operating condition of the work vehicle that provides an indication that the work vehicle is traveling downhill;
        determine whether at least one pre-condition for downshifting the transmission from a current gear ratio to a downshift gear ratio is satisfied when the operating condition indicates that the work vehicle is currently traveling downhill, the at least one pre-condition including a first pre-condition requiring that the requested speed be less than or equal to an estimated speed for the work vehicle following the downshift; and
        when it is determined that the at least one pre-condition is satisfied, control the operation of the transmission such that the transmission is downshifted from the current gear ratio to the downshift gear ratio.

10. The system of claim 9, wherein the requested speed corresponds to a requested axle speed for the work vehicle.

11. The system of claim 10, wherein the controller is configured to determine whether the first pre-condition is satisfied by determining whether the following relationship is satisfied:

$$\omega_{Req\_Axle} \leq \omega_{eng} * \eta_{downshift}$$

wherein, $\omega_{Req\_Axle}$ corresponds to the requested axle speed for the work vehicle, $\omega_{eng}$ corresponds to a current engine speed for the engine, and $\eta_{downshift}$ corresponds to the downshift gear ratio.

12. The system of claim 9, wherein the at least one pre-condition further comprises a second pre-condition requiring that a maximum allowable engine speed for the engine be greater than or equal to an estimated engine speed for the engine following the downshift.

13. The system of claim 12, wherein the controller is configured to determine whether the second pre-condition is satisfied by determining whether the following relationship is satisfied:

$$\omega_{max\_eng} \geq \omega_{eng} \frac{\eta_{current}}{\eta_{downshift}}$$

wherein, $\omega_{max\_eng}$ corresponds to the maximum allowable engine speed for the engine, $\omega_{eng}$ corresponds to a current engine speed for the engine, $\eta_{current}$ corresponds to the current gear ratio, and $\eta_{downshift}$ corresponds to the downshift gear ratio.

14. The system of claim 9, wherein the controller is further configured to monitor a current engine speed of the engine relative to a requested engine speed for the engine.

15. The system of claim 14, wherein the controller is configured to identify the operating condition of the work vehicle by identifying that the engine speed is greater than the requested engine speed.

16. The method of claim 7, wherein the controller is further configured to identify the operating condition by identifying that an engine torque for the engine is negative and that the engine speed is increasing over time.

* * * * *